US008943154B1

(12) United States Patent
Bodell et al.

(10) Patent No.: US 8,943,154 B1
(45) Date of Patent: Jan. 27, 2015

(54) SYSTEMS AND METHODS FOR MODELING RELATIONSHIPS BETWEEN USERS, NETWORK ELEMENTS, AND EVENTS

(75) Inventors: Colin Bodell, Seattle, WA (US); Craig V. Kulfan, Bainbridge Island, WA (US); Geoffrey E. Endresen, Everett, WA (US); Brian J. Feinstein, Mercer Island, WA (US); John G. Focht, Kirkland, WA (US); Luan K. Nguyen, Auburn, WA (US); Viraj Sanghvi, Seattle, WA (US); Brian T. Smith, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 204 days.

(21) Appl. No.: 13/469,961

(22) Filed: May 11, 2012

(51) Int. Cl.
*G06F 15/16* (2006.01)
*G06F 15/173* (2006.01)

(52) U.S. Cl.
USPC ............ 709/206; 709/218; 709/224; 709/226

(58) Field of Classification Search
CPC .................... G06F 17/30292; G06F 17/30575; G06F 17/30902; H01L 43/16; H01L 43/0811; H01L 45/12; H01L 51/32
USPC ......... 709/206, 220, 224, 226, 204, 218, 222, 709/223, 225; 707/734, 999.01; 706/14; 715/853; 345/440
See application file for complete search history.

(56) References Cited

U.S. PATENT DOCUMENTS

| | | | | |
|---|---|---|---|---|
| 7,480,712 | B2* | 1/2009 | Moy | 709/223 |
| 7,539,697 | B1* | 5/2009 | Akella et al. | 707/999.01 |
| 8,244,848 | B1* | 8/2012 | Narayanan et al. | 709/223 |
| 2006/0080417 | A1* | 4/2006 | Boutboul et al. | 709/220 |
| 2007/0220451 | A1* | 9/2007 | Arnone et al. | 716/1 |
| 2009/0027392 | A1* | 1/2009 | Jadhav et al. | 345/440 |
| 2010/0049678 | A1* | 2/2010 | Huang et al. | 706/14 |
| 2011/0208822 | A1* | 8/2011 | Rathod | 709/206 |
| 2012/0036250 | A1* | 2/2012 | Vaswani et al. | 709/224 |
| 2012/0102130 | A1* | 4/2012 | Guyot et al. | 709/206 |
| 2012/0117516 | A1* | 5/2012 | Guinness | 715/853 |
| 2012/0158858 | A1* | 6/2012 | Gkantsidis et al. | 709/226 |
| 2013/0117261 | A1* | 5/2013 | Sambrani | 707/734 |
| 2013/0212175 | A1* | 8/2013 | Cheng et al. | 709/204 |

* cited by examiner

*Primary Examiner* — Quang N Nguyen
(74) *Attorney, Agent, or Firm* — Sutherland Asbill & Brennan LLP

(57) ABSTRACT

Certain embodiments herein relate to modeling relationships between users, network elements, and events in an organization. Organizational information regarding users and network elements may be collected and analyzed to create a relationship graph relating users and network elements. The relationship graph may include nodes representing users and network elements and edges connecting pairs of users and/or network elements. The edges may be weighted based on a number of factors, such as operational dependencies, user preferences for receiving information associated with events, and a user's historical actions, which may determine whether a user may receive an event. A relationship graph as described herein may be leveraged to provide various uses, including generating a relationship subgraph that may allow users to identify the impact of events on other users and network elements in an organization.

23 Claims, 6 Drawing Sheets

US 8,943,154 B1

SYSTEMS AND METHODS FOR MODELING RELATIONSHIPS BETWEEN USERS, NETWORK ELEMENTS, AND EVENTS

BACKGROUND

Numerous network elements, such as software and hardware, may exist in an organization. Network elements may interact with one another to determine and implement business processes, resolve issues, or otherwise perform various activities in support of an organization. For networks with a large number of network elements, however, it may become difficult to perform such activities efficiently. For example, a computer outage may adversely affect many network elements in an organization, the extent of which may be unknown given various operational and organizational dependencies that may exist between the network elements. Existing systems may lack information that identifies relationships between network elements, and therefore, may struggle with timely identification of problems and/or the timely notification of persons who may be able to resolve the problems so as to limit their impact on the organization. Thus, finding improved ways to identify relationships between network elements and leverage such relationships to proactively and more efficiently resolve issues continues to be a priority.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items, however, various embodiments may utilize elements and/or components other than those illustrated in the figures.

DETAILED DESCRIPTION

Figure 1:
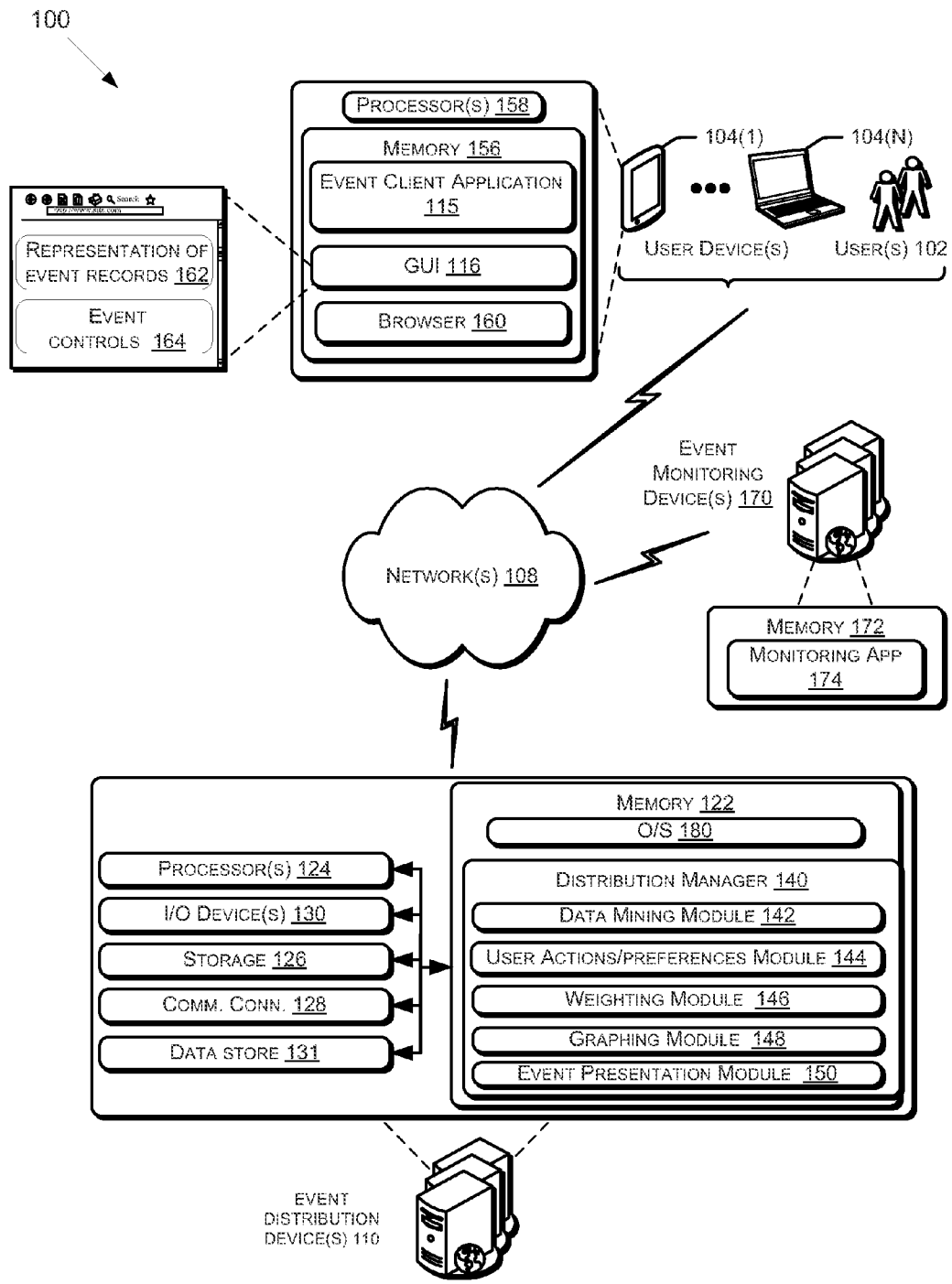
FIG. 1 illustrates an example block diagram of a computing environment for modeling relationships between network elements in an organization, according to one embodiment.

Illustrative embodiments herein are directed to, among other things, modeling relationships between users, network elements, and events that may occur with respect to the network elements. In an organization, network elements, such as computers, servers, databases, routers, etc., and the software running on such devices, may experience various events, such as outages, upgrades, reboots, health checks, and so forth. These events may be reported to various users in an organization based on certain factors, such as, but not limited to, the relationships between various users (e.g., employees, contractors, consultants, etc.) and the network elements within the organization, including the network element that experienced the event. These relationships, for example, may be based, at least in part, on the user's job assignment(s), direct interaction(s), and managerial or technical responsibilities, and may be defined or modeled, for example, in a relationship graph.

In addition to considering the relationships between users and network elements when determining which users to send notifications or reports in association with an event (e.g., event records), a user's behavior and/or preferences for receiving such notifications or reports associated with the network element that experienced the event may also be considered. For example, such relationships, user behaviors, and user preferences may be analyzed to determine scores or weights for an event with respect to each user in the organization. Such weights/scores may determine whether or not a user receives a record or report associated with the event. The relationships may be modeled in a way that they may be updated in accordance with changes to user preferences and historical actions with respect to the event. As used herein, an event may refer to an occurrence associated with users or network elements in an organization, including, but not limited to, outages, abnormal conditions, other incidents, or service requests. While certain embodiments refer to sending and receiving events, interacting with events, or similar, only a portion of the events, information associated with the events, or a representation of the events may be sent to or received from a device, or interacted with at a device. Thus, a notification, record, or report of an event, rather than an event itself, may be sent to and from a device, in certain embodiments.

Certain embodiments herein relate to generating a relationship graph to illustrate associations between users, network elements, and events that occur at network elements. The graph may include nodes that represent the network elements or the various software and hardware used by users in an organization. The nodes also may represent users, such as employees, contractors, consultants, etc. The nodes may be connected by edges that may be identified and/or defined by analyzing organizational charts and network topologies of an organization, which may result in a relationship graph encompassing, for example, users and network elements, wherein network elements may include hardware and software elements, as non-limiting examples. Other information that may be utilized in constructing the relationship graph may include, but is not limited to, network traffic (which may be observed from event pattern analysis or processing of service logs, as non-limiting examples), user input, naming conventions, natural language processing (e.g., analyzing portions of text strings for matches or similarities), liveliness over time (e.g., ignoring network elements that may have minimal or no contact with other network elements), source code repository information (e.g., an identification of users who may have worked on computer source codes, a comparison between times that source codes were checked in or returned to a computer system for use by other source code developers, or other indications of relatedness between computer source codes), inspection of source codes, or geolocation of network elements.

For example, an engineer may report to a manager and have a hardware technician report to him/her, and in addition, the engineer may be responsible for certain software applications running on one or more servers. A relationship graph representing these relationships may have nodes for each of the engineer, the manager, the hardware technician, the software application and each server on which the software application runs. The edges between the nodes may take into consideration the organizational relationship of the users, as may be represented in an organizational chart, and the network topology. Accordingly, in this example, an edge may exist between the engineer and the manager as well as between the engineer and the hardware technician. However, in this example, an edge may not exist between the technician and the manager since they are not in a direct line of report. In addition, edges may represent the relationships between the different network elements and between the network elements and the users. For example, an edge may exist between the software application and the severs on which it runs, as well as between the servers that run the same software application. Edges also may exist between the servers and, for example, the engineer and hardware technician, but not between the servers and the manager because the manager does not have direct responsibility for the servers. Similarly, an edge may exist between the software application and the engineer, though not between the software application and the manager or the hardware technician, because neither has direct responsibility for the operation of the software application.

A relationship graph relating users, network elements, and events in an organization may serve as a powerful tool for enabling various uses. One such use may include enabling the generation of customized views of relationships between users, network elements, and events in an organization. A customized view may facilitate a user's understanding of the impact of events on other users and network elements in an organization. A relationship graph may also be used to efficiently allocate resources in a cloud computing environment where hardware virtualization takes place. As an example, hosts in a cloud computing arrangement may be allocated such that software applications, for example, are redundant and efficiently balanced across physical server computers in the cloud computing arrangement. A relationship graph may further be used to assist in determining a severity of events that occur in an organization by, for example, determining the number of users impacted by an event and, in response to the event, generating notification lists of users based on an event, and proactively notifying users about events before they impact the users. Many such uses may be accomplished by virtue of a relationship graph's weighted associations between users, network elements, and events, according to certain embodiments.

In the example organization above, a server for which the engineer and hardware technician have responsibility may experience an outage event, which may in turn cause an outage event with respect to software running on the server. Each of the engineer, the hardware technician, and the manager may potentially be notified about the outage events, depending on the weight of the respective edges connecting each of these users to the server and software that experienced the outage events. For example, because the engineer and the hardware technician have responsibility for the server, their respective weights associated with the server may be relatively high compared to that for the manager who does not have responsibility for the server. Thus, the engineer and the hardware technician may be notified about the outage event at the server, whereas the manager may not be notified. Similarly, because the engineer has direct responsibility for the software that experienced an outage while the hardware technician and the manager do not have such responsibility, the engineer's weight associated with the software may be relatively higher than that for the hardware technician and the manager. Thus, the engineer may be notified about the software outage event, whereas the hardware technician and the manager may not be notified.

Whether the engineer, hardware technician, and manager receive an outage event record may further depend on their preferences or configuration settings with respect to the hardware and software outage events. For example, the engineer's preferences may indicate that the engineer is not interested in receiving hardware outage event records because, for example, the engineer is aware that the hardware technician may have a greater role in responding to hardware outage events. The engineer's preferences may indicate, however, that the engineer is interested in receiving software outage event records. Thus, based on the engineer's preferences, the engineer may not receive the hardware outage event record but may receive the software outage event record. The weights associated with the engineer, the hardware technician, and the manager may be adjusted according to their preferences such that, when compared to a threshold value, an event record may not be sent to these users if the weight is below the threshold value.

In addition to a user's preferences or settings, a user's historical actions with respect to the events may also influence whether the user receives an event record. For instance, in the example above, while the manager's indirect associations with the hardware and software that experienced outage events may be relatively low, the manager may receive event records associated with the event by virtue of the manager's interaction with the event records or related event records. For example, the manager may have indicated an interest in software outages by viewing such outages, adding comments to such outages, and saving such outages, each of which may be detected by systems described herein. As such activity by the manager increases, the manager's associated weight for software events may be adjusted such that, when compared to a threshold value, the manager may receive software outage event records. The same may be true for hardware outage events depending on the manager's historical actions.

After receiving event records, users may view at least a portion of a relationship graph to assess the impact of events on other users and network elements in an organization. This portion of the relationship graph may be based on edges, and the respective weights of those edges, that are deemed important to a user, may be determined based on factors such as user preference, hop count, edge weights, dependencies, historical user actions, etc. For instance, in the above example, a portion of the relationship graph associated with the engineer may include the engineer, the engineer's manager, the engineer's hardware technician, a database administrator, and the server and software that experienced the outage, while other users, servers, and software may be excluded, e.g., because weights associated with the excluded nodes were relatively low compared to those for the nodes included in the portion. Using such a portion of the relationship graph, the engineer may identify a potential impact of the software outage on the database administrator who may, for example, only use the software sparingly (e.g., as may be reflected in the database administrator's associated weight with the software) and therefore may be unaware of the software outage. The engineer may notify the database administrator of the software outage before it affects the database administrator, e.g., when the database administrator attempts to use the software. The engineer may also contact other users who may also be impacted by the software outage, and so forth, such that the impact of outages or service interruptions in an organization may be limited.

FIG. 1 depicts an example computing environment 100 for modeling relationships between users, network elements, and events. The computing environment 100 may include, but is not limited to, one or more event distribution devices 110, one or more event monitoring devices 170, and one or more user devices 104(1)-(N) (collectively user devices 104) for use by users 102. Each of these devices may communicate with one another over one or more networks 108 to facilitate relationship modeling as described herein. For example, the event distribution device 110 may communicate with the event monitoring device 170 to receive event records (e.g., notifications or reports) that may occur in association with network elements in an organization. The event distribution device 110 may send event records to the user devices 104, where users 102 may view or interact with them. Such viewing or interaction may be sent from the user devices 104, by one or more dedicated applications and/or a web browser, to the event distribution device 110 where such actions may be tracked and used in the determination of which event records to send to a user.

As used herein, the term "device" can refer to any component that includes one or more suitable processors that can be configured to execute computer-readable, computer-implemented, or computer-executable instructions. Example devices can include personal computers, server computers, digital assistants, personal digital assistants, digital tablets, Internet appliances, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate modeling relationships between users, network elements, and events as described herein.

Certain embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program may be configured to access, including signals downloaded through the Internet or other networks. For example, the distribution of software may be downloaded via the Internet.

The network 108 may include any number of wired or wireless networks that can enable various computing devices in the computing environment 100 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another. Other embodiments may not involve a network and may, for example, provide features on a single device or on devices that are directly connected to one another, e.g., the event monitoring device 170 may be directly connected to the event distribution device 110.

The devices illustrated in FIG. 1 may include one or more processors configured to communicate with one or more memory devices and various other components or devices. For example, the event distribution device 110 may include one or more processors 124 that are configured to communicate with one or more memory devices 122, one or more input/output (IO) devices 130, storage 126, one or more communication connections 128, and one or more data stores 131. The processor 124 may be implemented as appropriate in hardware, software, firmware, or combinations thereof. Software or firmware implementations of the processor 124 may include computer-executable or machine-executable instructions written in any suitable programming language to perform the various functions described herein.

The memory 122 may store program instructions that are loadable and executable on the processor 124, as well as data generated during the execution of these programs. Depending on the configuration and type of event distribution device 110, the memory 122 may be volatile, such as random access memory (RAM), and/or non-volatile, such as read-only memory (ROM), flash memory, etc. The memory 122 associated with the event monitoring device 170 may be the same or at least similar to the memory 122 in one embodiment.

The storage 126 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SRAM), dynamic random access memory (DRAM), or ROM.

The memory 122 and the storage 126, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 128 may allow the event distribution device 110 to communicate with other devices, e.g., user devices 104, databases, user terminals, and various other devices that may exist on the one or more networks 108. The input/output ("IO") devices 130 may enable a user to interact with the event distribution device 110. Such IO devices may include, but are not limited to, a keyboard, a mouse, a pen, a voice input device, a touch input device, a display, camera or imaging device, speakers, or a printer.

The one or more data stores 131 may store lists, arrays, databases, flat files, etc. In some implementations, the one or more data stores 131 may be stored in memory external to the event distribution device 110 but accessible via the one or more networks 108, such as with a cloud storage service. The data stores 131 may store information associated with network elements, users, events, and/or other information that may facilitate implementation of the processes described herein.

The event monitoring device 170 may include some or all of the devices or components described in association with the event distribution device 110, several of which are discussed below.

The memory 122 may also include an operating system 180 and various software applications and/or modules that may implement the functionality described herein. Example modules may include a data mining module 142 a user activity tracking module 144, a weighting module 146, a graphing module 148, and an event presentation module 150. Each of these modules may be implemented as individual modules that provide specific functionality associated with modeling relationships between network elements. Alternatively, one or more of the modules may perform all or at least some of the functionality associated with the other modules.

The distribution manager 140 may communicate with the user devices 104 to perform various functions. One such function may be authenticating users' access to event records. A user's access may be authenticated based on a user account associated with the user, which may be used to determine a user's access rights to event records. The distribution manager 140 may also send notifications to users that an event has occurred. If a user is not logged into an event distribution device 110, the distribution manager 140 may send to the user an electronic message informing the user of the event and/or directing the user to log into the event distribution device 110 to receive event records. The event records may be sent to the user device 104 via electronic mail, SMS text messaging, Interactive Messaging (IM), or another communication means for transmitting messages between devices. After logging into the event distribution device 110, the user may receive event records. If a user is already logged into an event distribution device 110 when an event occurs, the distribution manager 140 may push the event records to the user device 104.

The distribution manager 140 may also receive various information relating users, network elements, and events to one another. This information may include, but is not limited to, organization charts, network topologies, and system configuration files. The information may be collected and/or analyzed by the data mining module 142 to identify relationships between users and network elements. The identified relationships may be used by the graphing module 148 to generate and/or update a relationship graph with nodes that represent users and network elements, and edges connecting pairs of the nodes to represent an association between the users and network elements.

A weighting module 146 may determine a weight (or score) associated with an edge connecting users and network elements. Weights may determine which users receive certain event records as sent by the event presentation module 150, in one embodiment. Weights may be influenced by various factors including, but not limited to, a dependency between nodes in an organization. Weights may also be influenced by a user's preferences and historical actions. Various mathematical methods and/or techniques may be applied using variations of a hop count and dependency to determine a weight for edges.

The event presentation module 150 may interact with user devices 104. The user device 104 may include a processor 158, which can be configured to process computer-executable instructions in one or more memory devices 156, and a display 116. In certain embodiments, the one or more memory devices 156 may include an event client application 115, which may be a dedicated application or part of a dedicated application that renders and manages (e.g., drives) the presentation of information associated with event records on the display 116. The event client application 115 may also process event records, which may include filtering the event records and formatting the event records, for example, in the manner discussed below.

Filtering event records, e.g., via the event client application 115, may include determining which event records, portions of event records, or information associated with event records to send to a user. The event records, portions thereof, or associated information may provide details about an event. Such details may include, but are not limited to, a description of the event, the time that the event occurred, a number of related events, an owner of the network element at which the event occurred, an identification of the network element at which the event occurred, hardware or software error messages and/or codes, a number of users affected by an event, or a task list that may be performed by a user in response to an event, as non-limiting examples. Different users may receive different versions of these details, based at least in part on user account credentials in one embodiment. As an example, if a software application experiences failed execution, a software developer may receive an error code associated with the failed execution while a manager may not. Additionally, a software developer may also receive a task list instructing the software engineer to, for example, debug the software code, recompile the code, and redeploy it to a specified server. Event records may also be filtered based on the type of user device (e.g., to fit the size and/or resolution of graphical user interface (GUI) 116). Various other filtering criteria and/or techniques and examples involving filtering based on different event information or details than that described in the above example may exist in other embodiments.

Formatting event records, e.g., via the event client application 115, may include providing various formats or techniques for displaying information at the user devices 104, where a dedicated event client application 115 may provide a GUI 116 representation of event records 162. One formatting technique may include presenting a relationship graph that includes nodes representing users, network elements, and edges connecting users and network elements. At least some of the nodes in the relationship graph may be color-coded, have different sizes than other nodes, or some other indication to distinguish the nodes based on events occurring at the nodes, in one embodiment. Events may be distinguished based on information that may be associated with the event, such as, but not limited to, the location of an event, the severity of an event, an owner of a network element experiencing an event, one or more users who have been notified about the event, the age of an event, or the status of an event (e.g., a hardware or software outage event). In one example, nodes that are experiencing one or more severe events may be shaded red, nodes that are experiencing less severe events may be shaded yellow, and so forth. As another example, older events (e.g., based on duration of existence) associated with a node may be shaded or grayed out to distinguish them from newer events.

Additional formatting techniques may include a zoom feature to focus in on certain nodes within a graph, pop-up windows alerting users about an event, hover features that may display event information on a mouse-over action, multimedia clips that may play video and/or audio information about an event, and hyperlinks on which a user may click to receive more information about an event, as non-limiting examples.

Event records received at a user device 104 also may be viewed or interacted with by a user via a browser 160, in one embodiment. The browser 160 may be utilized to communicate with the distribution manager 140, or a web server associated therewith, via network 108. The web browser 160 may display a web page GUI 116 via a markup language application such as Hypertext Markup Language (HTML) or extensible markup language (XML), which may include embedded server-side code on the event distribution device 110, such as Java, Java servlets, or Perl, that may implement the described functionality.

The GUI 116, as may be generated by the event client application 115 or the browser 160, may include a representation of event records 162 and event controls 164 for viewing and interacting with event records, respectively. The representation of event records 162 may display the event records as described above. The event controls 164 may facilitate a user's interaction with event records (e.g., user historical actions as described herein). Such interactions may include, but are not limited to, adding comments associated with the event records, deleting event records, prioritizing event records by marking or flagging certain event records, or saving event records locally. The event controls 164 may also facilitate sending the user's actions to the distribution manager 140 where they may be analyzed by the user actions and preferences module 144 to, for example, adjust weights in the relationship graph associated with a user.

The above examples are not meant to be limiting. Many more examples related to formatting, filtering, and interacting with event records may exist in other embodiments. While various functions are described above with respect to particular devices, it is understood that these functions may be distributed in many ways across the devices. For example, functionality provided by the event distribution device 110 may be provided at least in part by the user devices 104 and/or the event monitoring devices 170.

Figure 2:
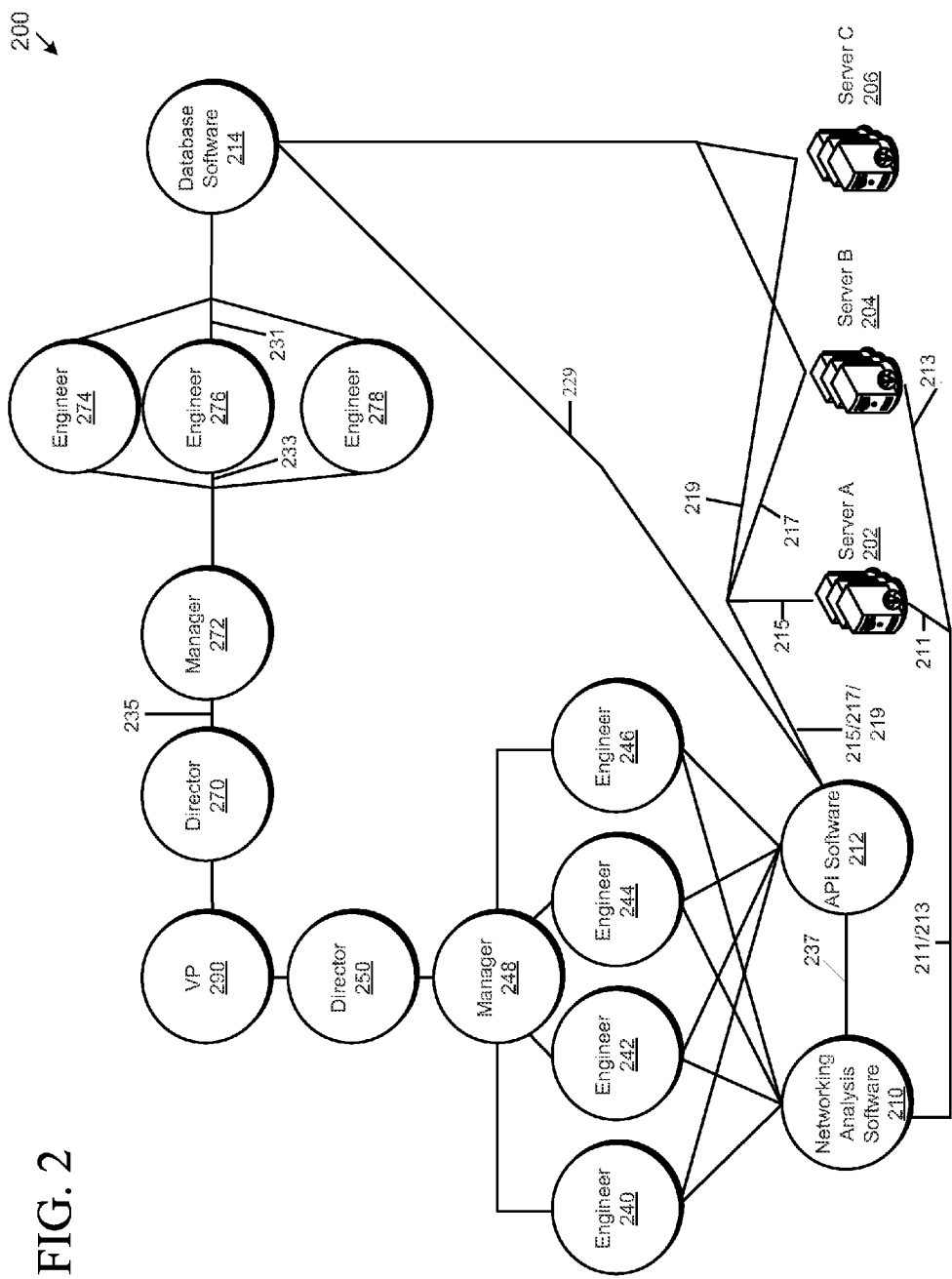
FIG. 2 illustrates a schematic diagram of a relationship graph relating network elements to users, software, and hardware in an organization.

FIG. 2 illustrates an example relationship graph 200 relating users, software, and hardware in an organization. Nodes may represent users in the organization, such as the vice-presidents, directors, managers, and engineers illustrated. Nodes may also represent hardware, such as servers 202, 204, and 206, as well as software, such as software applications 210, 212, and 214. The nodes may be connected by edges. For example, edges 211 and 213 may connect pairs of nodes in the organization. In one embodiment, such a relationship graph may be generated by a graphing module 148 of the distribution manager 140. Although only one vice-president-level organization is shown in FIG. 2, many more vice-presidents having a relationship with other users, software, and hardware may exist such that hundreds or even thousands of nodes, for example, may exist in other examples.

The relationship between users and network elements may be established by mining various data, e.g., via data mining module 142 of the distribution manager 140, to identify associations between users and network elements in an organization. For example, organizational charts may relate users to one another based on a reporting structure in an organization, committees to which users may belong, groups, subgroups, or other associations of users. Network topologies and hardware and software system configuration data may relate hardware and software to each other and to users. Purchase orders specifying hardware and software for a particular organization may also provide an association between users and network elements. Computer software commands may be executed to learn which software applications are installed on a server, network trace commands can be executed to determine connections between routers and/or servers on a network associated with an organization, and so forth, such that numerous associations between users and/or network elements may be accessed at a network-accessible location and analyzed to identify such associations. Numerous other information resources may be used to identify and define relationships between users and network elements in other examples, including Lightweight Directory Access Protocol (LDAP) and various networking, hardware, and software configuration files. As an example of how such associations may be leveraged, as new users are added to an organization, they may be quickly associated with hardware and software by virtue of belonging to a particular organization. Therefore, once established, a relationship graph as described herein may provide a foundation for quickly relating new or replaced users and network elements in an organization. The association between users and network elements in an organization may be leveraged for numerous other uses (as will be discussed in greater detail below). While certain embodiments herein discuss the generation and use of a relationship graph, other embodiments may not involve a relationship graph. According to these embodiments, information may be stored in a relational database and used to model relationships between users, network elements, and events without generating a graphical representation of nodes and edges. Thus, this disclosure is not limited to the use of a relationship graph to provide the features and functions described in association with a relationship graph herein.

As shown in FIG. 2, edges may connect each of the nodes, some of which have been numbered to facilitate the present description. For example, an edge 211 may illustrate a connection between software 210 and server 202, edge 213 may illustrate a connection between software 210 and a redundant or backup server 204. Similarly, the edges may connect users in the organization. For example, the vice-president 290 may have direct reports, such as the director 250 and the director 270, to whom he may be directly connected. The director 250 may also have a direct report, such as the manager 248, and the director 270 may have a direct report, such as the and manager 272, (both managers being indirect reports to the vice-president 290) to whom he/she may be directly connected, and so forth, as illustrated in FIG. 2.

In one embodiment, the edges connecting pairs of nodes in graph 200 may be scored or weighted, e.g., by the weighting module 146 of the distribution manager 140. Factors considered in determining the weights may include, but are not limited to, operational dependencies between nodes, organizational responsibilities, importance of node(s), user preferences, historical data, event patterns, the impact of an event on a business (e.g., business impact), network boundaries across firewalls, edge type, etc.

With regard to business impact, certain network elements may be designated as more critical than others (e.g., tier 1 on a scale of 1-10 with 1 being most critical). Events that occur in these network elements, or other network elements related to these network elements, may be considered to have a relatively high business impact on an organization. Thus, in one embodiment, any edge in a relationship graph associated with a tier 1 network element may be a tier 1 edge such that events occurring at the tier 1 network element or the network element associated with a tier 1 edge may be considered tier 1 or most impactful to an organization. Network elements and associated events may be designated as different tiers, or may have varying degrees of impact (other than tier 1 in the above description), in other embodiments.

The edges in a relationship graph may be characterized by type, wherein the type of edge may impact the weight applied to that edge. The types of an edge may vary based on the nodes or network elements to which an edge is connected. For example, an edge connecting two users may be a different type than an edge connecting two network elements. For example, in FIG. 2, the edge type associated with the edge 235 between manager 272 and director 270 may be based at least in part on the relationship between the manager 272 and the director 270. In one example, the director 270 may be the manager's 272 permanent director, temporary director, or mentoring director, each of which may be considered a different edge type or status. An edge connecting the manager 272 to a permanent director may be weighted ten (10), while an edge connecting the manager 272 to a temporary director or a mentoring director may be weighted six (6) and three (3), respectively, to indicate the relative importance of the relationships between the manager 272 and the persons to whom the manager 272 reports (e.g., the director 270). Thus, after the occurrence of an event, the director 270 may or may not receive a notification of the event based on the edge type associating the director 270 with the manager 270. Similarly, edges connecting network elements may vary according to type. In one example, such edges may vary according to the type of event that occurred, such as an outage, hardware or software upgrade, hardware reboot, or hardware or software health checks. Each of these event types may receive a different weight based on any number of factors, such as their importance to a user, as will be discussed in greater detail below. In this way, a type of event may serve as a filter for determining the weight for an edge and ultimately determining whether a user will receive a notification of an event, in one embodiment. The above example edge types are non-limiting. Many more edge types may exist between users and/or network elements in other examples.

An operational dependency may describe a reliance or operational relationship between network elements. A reliance may mean that one network element depends on another network element to perform a function, provide an input and/or output to the network element, or facilitate the operation of other network elements, as non-limiting examples. For example, a dependency may exist between a software application and hardware that executes the software in a way that the software may depend upon the hardware to operate. Dependencies may be lessened in various ways, such as by the existence of redundant or backup devices or software instances. The software above, for example, may not depend as much on the hardware for execution if a redundant server is available to execute the software in the absence of the primary hardware. A dependency may also be determined based on an operational relationship between nodes, which may include, but is not limited to, a frequency of communication between network elements, a fulfillment chain association between the network elements, or common maintenance activity associated with the network elements.

A user's preferences may include one or more parameters or settings, for example, that may be modified by a user to filter event records received by the user. Examples of such settings may include, but are not limited to, type of event (e.g., hardware and/or software), type of hardware and/or software identified in the event record, the function of the hardware and/or software identified in the event record, severity level threshold, time of day an event occurred, an owner of the network element identified in the event record, etc.).

A user's historical actions may include, but are not limited to, viewing the event record (e.g., clicking on a reference), adding comments to event records, deleting event records, and storing event records locally at a user device. Certain actions may influence a weight associated with an event (e.g., the weight applied to the edge connecting the user to the network element) more so than others. For example, adding comments to event records may have a greater influence on the weight than viewing the event records because adding a comment may suggest that the user may be assisting other users with handling the event. Deleting an event record may have an even greater influence because such action may indicate that the user is no longer interested in receiving information about the event. Therefore, a weight for an edge in the relationship graph associated with an event may be increased above the threshold value such that the user may no longer receive an event record associated with the event.

With reference to FIG. 2, the edges may be weighted relative to one another, with weight values applied or assigned to each edge. For example, the edges 215, 217 and 219 connecting the API software 212 to the three servers 202, 204 and 206, respectively, may each be assigned a weight of eight (8), where the edges 211 and 213 connecting the networking analysis software 210 to the two servers 202 and 204, respectively, may each be assigned a weight of ten (10). In this example, the edges 215, 217 and 219 may have a lower weight than edges 211 and 213 because there is greater redundancy provided for the API software 212, and therefore, the relative importance of the operation of any one of servers 202, 204 and 206 is less with respect to the API software 212 than the relative importance of the operation of servers 202 and 204 with respect to the network analysis software 210. As another example, the weights applied to edges 238-252 connecting the networking analysis software 210 and the API software 212 to engineers 240, 242, 244, and 246 may be ten (10), whereas the weights applied to edges connecting the manager 248 to the engineers 240-246 may be five (5). In this example, the difference may be because the engineers are considered more critical than manager 248 to the operation of the networking analysis software 210 and the API software 212. In a similar fashion, the edges connecting engineers 274, 276, and 278 to the database software 214 may have a weight of fifteen (15) because of the relative operational importance of the database software 214, for instance, because it may support a customer services, be required for certain network security measures, has fewer redundancies, etc.

In certain embodiments, edges may be weighted according to a directional component or relationship between network elements. A directional relationship may indicate a dependency that a first network element may have on a second network element, but that the second network element may not have on the first network element. In an example different from that above, the engineers 240 and 242 may be considered more critical to the operation of networking analysis software 210, which may have a strong dependency on API software 212 to perform its functions, hence a relatively high weight of twelve (12) assigned to edge 237 connecting the networking analysis software 210 to the API software 212. Engineers 244 and 246, who may be considered more critical to the operation of API software 212, however, may have a relatively low weight of two (2) assigned to edge 237 because API software 212 may have a relatively weak dependency or directional relationship with the networking analysis software 210. That is, the API software 212 may require little or no assistance or functionality from the networking analysis software 210 to perform its functions. In addition to weighting or scoring each edge of graph 200, weights or scores may be applied to multi-hop connections. For example, a weight (or total weight) may be applied to the multi-hop connection between, for instance, API software 212 and manager 248. The total weight may be determined by mathematically combining the weights of edges between the node associated with the API software 212 and the node associated with manager 248. In this present example, where multiple paths exist, an average total weight or median total weight may be determined. Alternatively, the highest or lowest total weight may be utilized. When combining weights over multiple hops, a dilution or reduction factor may be applied in determining the total weight. For example, the weights of the edge between the API software 212 and the engineer 244 may be seven (7), and the weight of the edge between engineer 244 and manager 248 may be five (5), which when added equals twelve (12), but a factor of ⅓ may be applied to the total since this node pair includes two hops, resulting in a total weight of four (4) (twelve divided by three equals four, or 12/3=4). This is merely a simple example of the possible mathematical computations that may be applied to a single or multi-hop node pair to determine a total weight.

Once determined, the weight or score may be dynamically or manually updated or adjusted. For example, a dynamic update of weights may occur if server 204 has an outage event. In such circumstances, the weight applied to edge 211 may increase to account for the fact that the networking analysis software 210 is operationally more dependent on server 202. As another example, the weighting module 146 may determine that database software 214 is subject to an increase in network activity, such as may be based on network communication volume or event tracking activity, and the weights applied to one or more edges connected to database software 214 may be dynamically increased. An example of a manual update or adjustment may occur when a user is removed or added to the graph 200. For instance, if director 270 is removed from the graph 200 then a new edge and corresponding weight may be applied between the manager 272 and the vice-president, which weight may be manually set.

The above examples provide illustrative approaches to weighting edges. Various other mathematical functions and/or techniques may be used to weight edges in other embodiments. In other embodiments, the edges may include a binary value that may correspond to receiving or not receiving an event record, as another non-limiting example.

A relationship graph, such as relationship graph 200 discussed above, relating users, network elements, and events in an organization may serve as a powerful tool for enabling various uses. Such uses may include, but are not limited to, building customized views of relationships between users, allocating virtual hosts in a cloud computing arrangement, generating notification lists based on an event, proactively identifying events before they occur, determining the severity level of an event, conducting mock simulations, such as the effect of the addition or removal of users and/or network elements from an organization, performing hotspot visualization (e.g., determining troubled network elements in an organization based on numerous occurrences of events in such network elements), and generating passive notifications, such as newsfeeds to which a user may subscribe.

Figure 3:
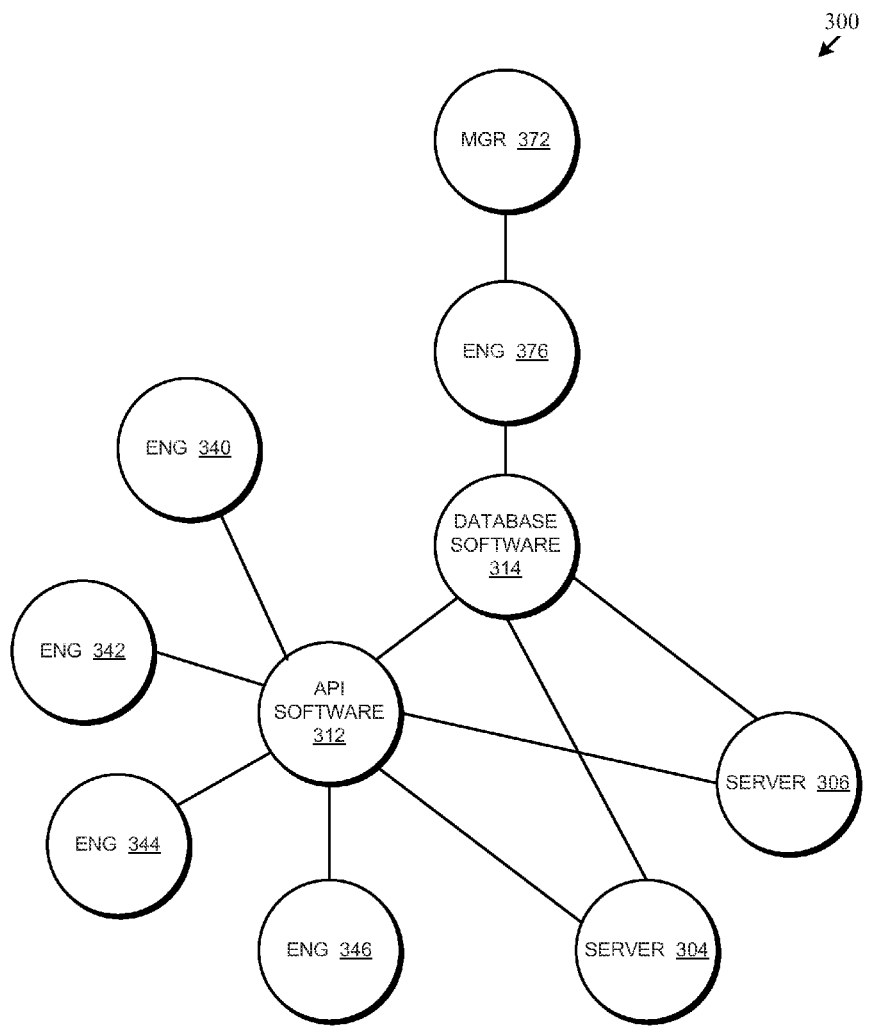
FIG. 3 illustrates a schematic diagram of a relationship subgraph associated with a user in the organization of FIG. 2, according to one embodiment.

FIG. 3 illustrates a schematic diagram of a relationship subgraph associated with a user in the organization of FIG. 2, according to one embodiment. As shown in FIG. 3, a relationship graph may be used to generate a customized view for a user in the form of a relationship subgraph 300, which may be generated by the graphing module 148 of the distribution manager 140, in one embodiment. While a relationship graph illustrates relationships between users, network elements, and events in an organization, a relationship subgraph may illustrate relationships between network elements and events from the perspective of one or more users in an organization, such as a division, a workgroup, a department, or other association of users. A relationship subgraph may be generated from the relationship graph and may include at least a portion of the nodes and edges in a relationship graph. For example, a relationship graph may include an organization of 5,000 nodes while a relationship subgraph may include only 100 of those nodes. The relationship subgraph may be generated based on edges, and the respective weights of those edges, that are deemed important to the user, may be determined based on factors such as user preference, hop count, edge weights, dependencies, historical user actions, and edge types. In some embodiments, a personal subgraph may exist for each user in an organization, such as engineer 276 as shown in the example of FIG. 3, which will now be described.

A relationship subgraph 300 for an engineer 276 in the organization of FIG. 2 may be generated, as shown in FIG. 3. The nodes shown in the subgraph 300 may have been selected because of their importance to engineer 376. For example, engineer 376 may depend on servers 304 and 306, API software 312, and database software 314 to perform job functions. Further, engineer 376 may also be a member of a technical committee of which engineers 340, 342, 344, and 346 are also members. Engineer 376's manager may also be included in the subgraph 300 because engineer 376 reports directly to manager 372. Because of the importance of these relationships, weights associated with these nodes may be relatively high compared to weights associated with nodes not included in the subgraph 300, hence the selection of the server and software nodes (for performing job functions) and user nodes (committee members) in the subgraph 300 for engineer 376. Numerous other criteria may be used to select the nodes in subgraph 300 or other nodes, in other embodiments.

Events that are associated with events at or related to network elements in the subgraph 300 may or may not be received by a user, based on various criteria such as the user's preferences and/or historical actions with respect to the events. Such criteria may indicate a user's interest in events that occur in an organization. For example, user preferences for engineer 376 may indicate or suggest that engineer 376 is interested in receiving software event records but not hardware event records. Additionally, engineer 376's historical actions of viewing numerous software event records while deleting hardware event records may also suggest that engineer 376 is interested in receiving software event records and not hardware event records. Therefore, as an example, engineer 376 may not receive hardware event records that may occur in association with servers 304 and 306 but may receive event records that may occur in association with API software 312 and database software 314. Many more examples may exist in other embodiments, which may involve different user preferences and/or user historical actions, different nodes, and associations depicted in subgraph 300, etc.

According to certain embodiments, a relationship graph or subgraph may include certain information about an event. The users may use the information to resolve the event, such as an outage. As users interact with an event record, additional information and/or updates may be attached to the relationship graph or subgraph. Such information may indicate a user's knowledge regarding the event and/or attempts to resolve the event. Additional users may thereafter access the information and leverage it to respond to the event in a manner consistent with their knowledge or experiences, in one embodiment. The additional users may also include additional information that may be added to the relationship graph such that a relationship graph may progress or expand through an organization as multiple users are informed about an event and provided with an informed (e.g., based on the included information) opportunity to respond to the event. Thus, a relationship graph or subgraph may itself be sent as an event record or a report, which delivery may be triggered by an occurrence of events, such as outages, upgrades, reboots, health checks, etc., taken alone or in combination. Such an event record may include nodes and connecting edges of a relationship graph, and information and details associated with an event, as described above.

In addition to including information about an event with a relationship graph or subgraph, users may also post updates or comments about an event. As one user includes or posts such information, other users may view the information, e.g., via a refresh function in a browser 160 or a more fluent update via an event client application 115, both of which may reside at a user device 104. A user may access the information via the user interface, such as via a mouse-over or hover feature that results in the information being displayed the information, click on a reference associated with the information, or perform other techniques to display the information associated with an event. In some embodiments, after an event such as an outage is resolved, an outage event record associated with the event may be indicated as resolved or may no longer be available for viewing or interaction by users.

As an example, the above-described relationship graph or subgraph may be used to identify and resolve a computer server outage. When a server experiences an outage, the server may not know its location but a relationship graph as described herein may include such information. For example, a relationship graph may include location information for the server, such as a city in which the server resides, a street address for the building that stores the computer server, a network address, and a rack and bay location in a rack mount configuration, as non-limiting examples. In one embodiment, such information may be obtained from geolocation information and/or via processing service logs, as non-limiting examples. The information may be included along with a notification about the computer server outage. According to the present example, a first computer server may experience an outage event, which may be communicated to multiple hardware users having responsibility for the server. As described above, the users may interact with an event record to view information associated with an event, respond to the event, and/or attach or submit additional information that may be used to resolve the event. Thereafter, or during receipt of a notification about the first server outage, one or more additional server outage notifications may also be received, each including similar information to that received for the first server outage. A user who received the notifications may perform a work function based on a task list, which may instruct the user to verify information associated with the geographical location of the servers. After reviewing such information, the user may determine that each of the servers is located in the same rack mount of a building, which may indicate an issue with the rack mount.

In another example, computer server outages and other equipment outages experienced at different rack mounts at various locations in a building may indicate the occurrence of a larger event, such as a storm or natural disaster. A user who makes such a determination may update the relationship graph (e.g., event record in one embodiment) with this information so that other users may use it to perform their work functions based on a different task list included with an event record, in one embodiment. Numerous other examples of using a relationship graph and the information therein to respond to events such as outages may exist in other embodiments.

A relationship graph, e.g., relationship graph 200 in FIG. 2, may also be used to allocate virtual hosts in a cloud computing arrangement. A software application may be associated with a virtual host in a cloud, and a virtual host may be associated with a physical server in the cloud. Certain embodiments herein may use a relationship graph to determine an association between users, software applications, and physical servers. As shown in the example relationship graph 400 of FIG. 4, the networking analysis software 410, API software 412, and database software 414 are connected only to server 404. While server 402 and 406 exist in an organization (e.g., as determined by a network topology according to one example), no software applications may be connected to them. Each software application in FIG. 4 may depend on server 404. Because of this configuration, if server 404 were to experience an outage, engineers 440, 442, 444, 446, 474, 476, and 478 would be unable to execute any of the software applications 410, 412, and 414 in the present example. Because a relationship graph as described herein illustrates relationships between users, network elements, and events, a user viewing the relationship graph in FIG. 4 may notice that the software applications 410, 412, and 414 each belong to the server 404 and should be distributed among several servers (such as servers 402 and 406) to provide redundancy (as illustrated in FIG. 2).

A relationship graph, e.g., relationship graph 200 in FIG. 2, may also be used to proactively identify and report events before they occur at certain network elements. A relationship subgraph, e.g., the relationship subgraph 300, by virtue of displaying network elements and associated weights, may indicate to a user the effect that events occurring in an organization may have on other users and network elements, e.g., those in a user's relationship subgraph. A subgraph may, therefore, allow a user to proactively identify and report events because the user may experience an event (e.g., an outage) before other users experience it because, for example, the user may depend on a network element (as indicated by an associated edge weight), e.g., the network element that experienced an event, more so than other users (as indicated by their associated edge weights). Using a relationship subgraph, a user may identify an association between another user and the network element at which the outage event occurred, albeit a weak association as indicated by the associated edge weight, in one example. The user may notify others about the event before they experience it, for example, if their primary server experiences an outage and they thereafter need to rely upon the network element that is experiencing an outage event.

As one example, in the example relationship graph of FIG. 2, engineer 276 may have a weight associated with an outage event at server 204 that is greater than a threshold value. Engineer 244, who also uses server 204, may use it sparingly as compared to his use of server 202. Engineer 244's instance of API software 212 may, for example, rely upon server 202 but switch over to server 204 in the event that server 202 experiences an outage. Because of this configuration, a weight that is lower than a threshold value may exist for engineer 244 with respect to events that occur at server 204, and therefore engineer 244 may not receive an event record associated with server 204. According to this configuration, engineer 276, who may receive the event record, may notify engineer 244 about the outage event at server 204 before engineer 244's instance of API software 212 is affected by the outage event at server 204, e.g., assuming an outage may occur at server 202 and a new instance of the API software 212 may be attempted on server 204 as a result. Engineer 276 may be able to provide such a notification because, as shown in FIG. 3, engineer 276's relationship subgraph may inform him that engineer 244, and possibly other users, may be affected by the outage event at server 204.

In addition to users sending proactive notification, a server, such as the event distribution device 110, may also proactively notify users of events. In the above example, the event distribution device 110 may also notify engineer 244 about the potential impact of the outage event at the server 204 on the engineer 244 because it too may be aware of the association between the engineer 244, the API software 212, and the servers 202 and 204.

A relationship graph, e.g., relationship graph 200 in FIG. 2, may also be used to generate a list of users to notify about an event. In one example, the notification list may be based on the users' weights associated with the event. Users who have a weight that is greater than a threshold value, for example, may be included on the notification list while users whose weights are lower than a threshold value may not be included on the notification list. As noted, weights may be based on operational dependencies between the users and network elements in an organization, user preferences, historical actions, etc. In some embodiments, a notification list may not be based on weights but may be based on factors associated with the event, such as, but not limited to, the event, e.g., the type of event, severity of the event, time of day of the event, description of the event, etc. As an example, high severity events that may impact an entire organization may be distributed to certain users independent of a weight, e.g., operational dependencies, or a user's preferences or actions. Upper level managers, for example, may be notified of such high severity events. In one embodiment, the managers may be ranked and a percentage of the managers, e.g., top 50%, or all of the managers, may be notified about the event. Additionally, in some examples, a user may not receive certain event records, e.g., event records including sensitive information, regardless of the user's weight associated with the event. Numerous other examples that involve determining notification lists based on factors other than weight may exist in other embodiments.

As another example, a relationship graph as described herein may determine the severity of events based on factors, such as the number of users impacted by an event. Because a relationship map relates users, network elements, and events, the number of users that may be impacted by an event may be determined and used to determine the severity event, e.g., a severity level such as a scale of 1 to 10, where 10 is most severe. As the number of users affected increases, so too may the severity level. Considerations other than number of users affected may be used in other examples, such as, but not limited to, the number of servers affected by an event, the number of servers without an assigned redundant server affected by an event, or the number and type of software applications running on a server affected by an event.

Figure 4:
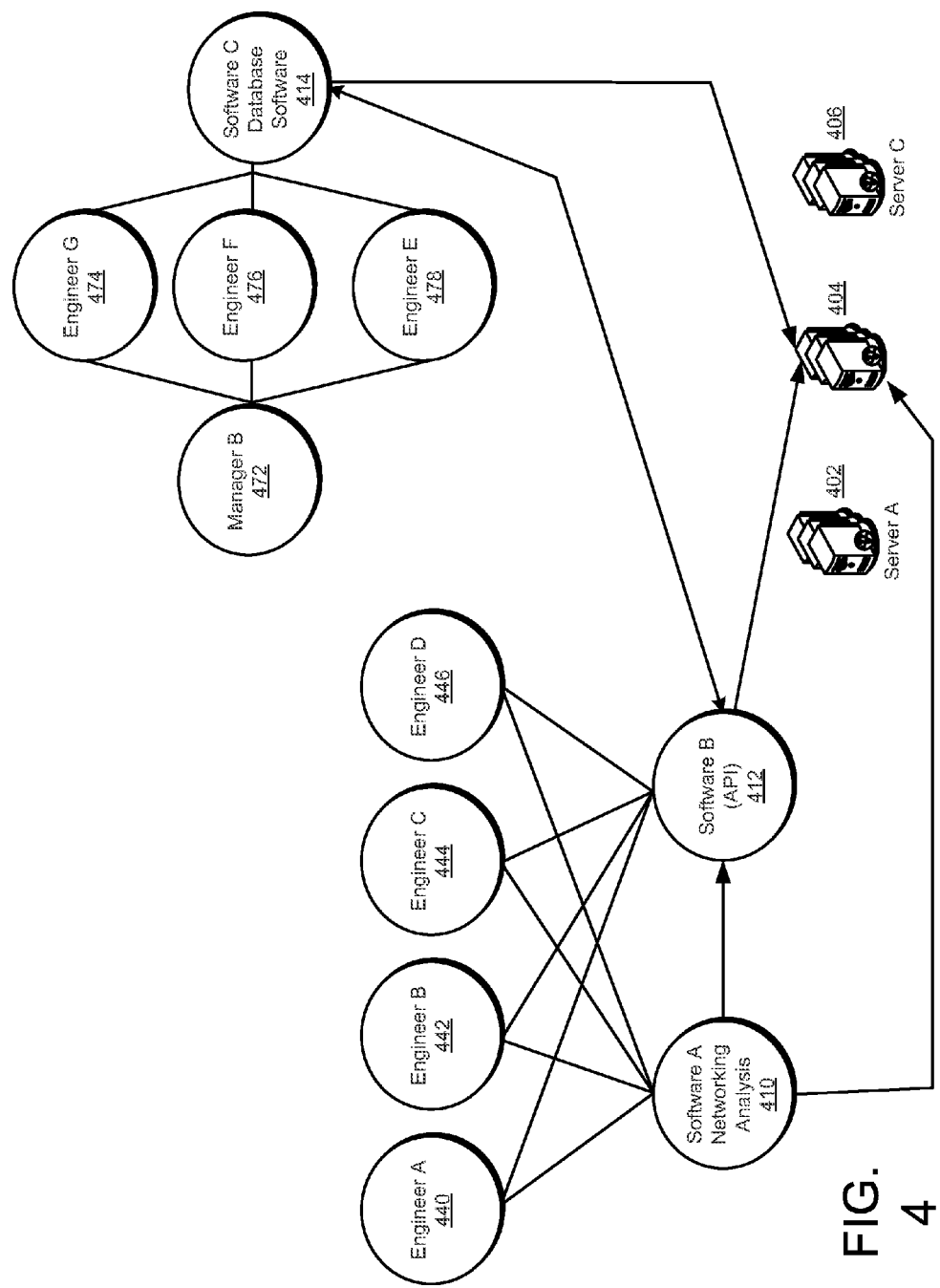
FIG. 4 illustrates a schematic diagram for facilitating a discussion of host reallocation, according to one embodiment.
Figure 5:
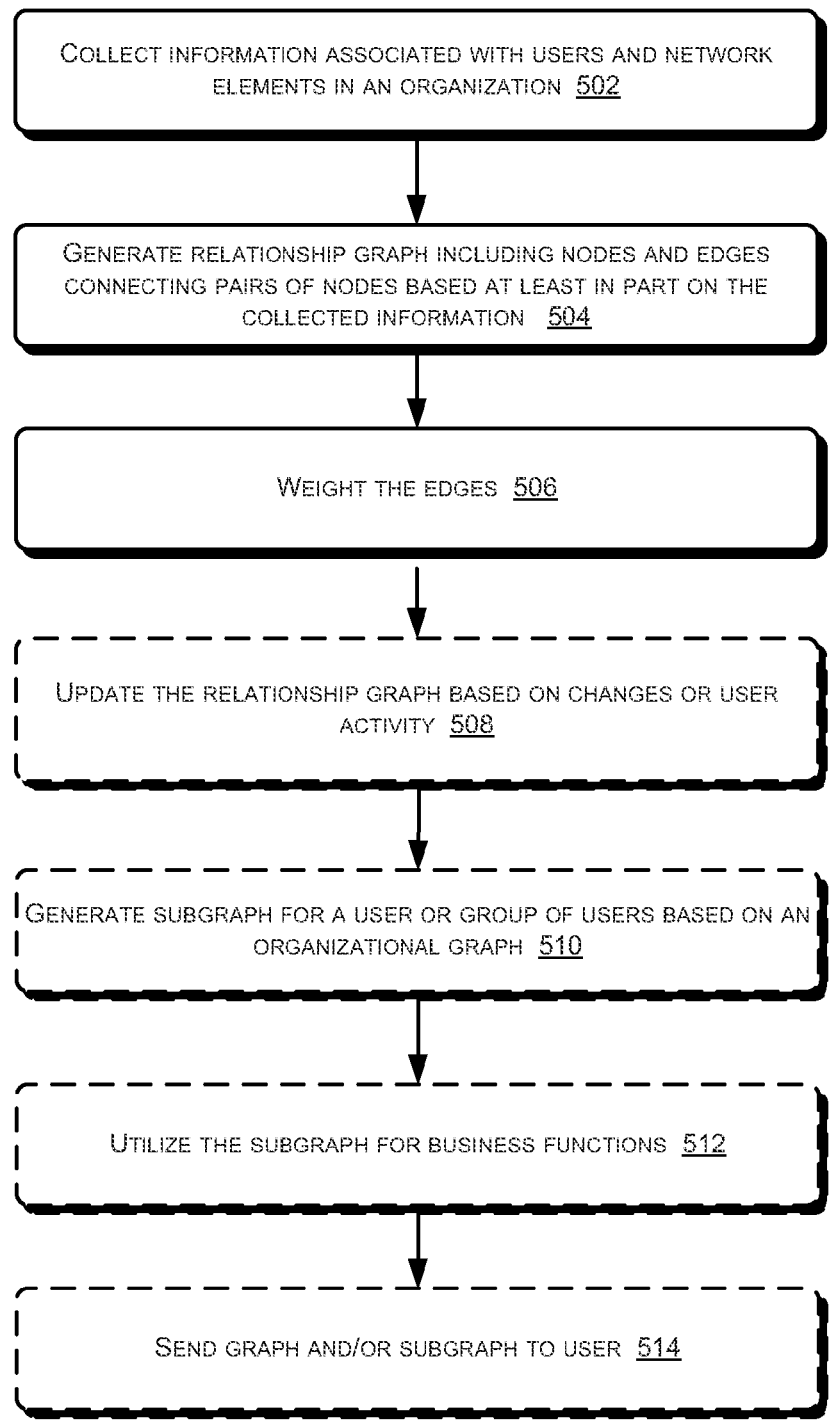
FIG. 5 illustrates an example flow diagram of an example process for generating a relationship graph and a relationship subgraph, according to one embodiment.

As another example, a relationship graph as described herein may facilitate root cause analysis to determine a source of events that occur in an organization. A source of an event may be difficult to identify in a cloud computing arrangement in which users may know a virtual host associated with their software but may not know the physical server on which the software runs. For example, as shown in FIG. 4, engineers 442, 446, and another engineer on a firewall-protected network, may report a problem with API software 412 because, for example, the functions that are typically performed by the API software 412 are not working properly. The engineers may be unaware of the association in a cloud computing arrangement between API software 412 and server 404. After viewing a relationship graph such as that displayed in FIG. 4, which illustrates the association between API software 412 and server 404, and also may illustrate virtual hosts (not shown) associated with API software 412 and server 404, it may be determined that server 404 (not API software 412) may be the source of the problem reported by the engineers. FIG. 5 illustrates an example flow diagram of an example process for generating a relationship graph, according to one embodiment. At block 502, various information associated with users and network elements in an organization may be collected, e.g., via data mining module 142. Such information may include organization charts and network topologies, which may be used to associate users to network elements. The information may also include user preference information, user historical actions, and information identifying operational dependencies between network elements, as non-limiting examples. In one embodiment, the data mining module 142 may access information at various locations on a network, while information may be pushed to an event server, e.g., event distribution device 110 for receipt by a distribution manager 140, in another embodiment.

At block 504, a relationship graph may be generated, e.g., by the graphing module 148, based at least in part on the collected information. A relationship graph may include nodes to represent users, network elements such as software and hardware, and edges connecting users and network elements to indicate associations between pairs of users and/or network elements. Weights may be applied to the edges of the relationship graph at block 506 to indicate an importance between the association of nodes connected by the edges. Such importance may be based on operational dependencies between nodes, organizational responsibilities, user preferences, user historical actions, historical data, and event patterns, as non-limiting examples.

At block 508, the relationship graph may be updated (if necessary) based at least in part on changes or user activity. Changes may include, but are not limited to, organizational changes such as adding or removing users or network elements from an organization, or changes to a user's preferences. Such changes may affect the weighting of edges. For example, if a user is removed from a relationship graph, e.g., relationship graph 200 of FIG. 2, then a new edge and corresponding weight, which may be manually set, may be applied between a pair of remaining users to reflect the importance of the new association between the pair of remaining users. As another example, a user's historical actions may affect the weight of an edge between nodes. For instance, when a user deletes an event record at a user device, e.g., user device 104, such action may be used to reduce the weight for an edge such that a user may no longer receive the type of event record that the user previously deleted. Many more examples may exist in other embodiments, including those that involve different organizational changes, other changes, changes to user preferences, or user historical actions, as examples.

At block 510, a subgraph for a user or a group of users may be generated based on an organizational graph. A subgraph may include a portion of the nodes and edges included in an organizational graph. For example, while an organizational graph may include 5,000 nodes, only 100 nodes may be included in the subgraph. A subgraph of the subgraph may also be generated which may include only 10 of the 100 nodes, for example, and so forth, such that portions of groups or organizations may be created from larger portions of groups or organizations. Nodes in the subgraph may be selected given their importance to a user or a group of users, which may be based on the various criteria used to determine weights discussed herein. A subgraph may enable its recipient, e.g., a user or group of users, to view and analyze the impact of events on other users and network elements in an organization. In one embodiment, a user or a group of users receiving a subgraph may receive an event record and inform other users who may not yet have been impacted by an event.

A generated subgraph may be utilized for various business functions at block 512. As discussed, such functions may include, but are not limited to, allocating virtual hosts in a cloud computing arrangement, generating notification lists based on an event, proactively identifying events before they occur, and determining the severity level of an event. A relationship graph or subgraph may be sent to one or more users at 514, where it may be viewed and interacted with on a user device, e.g., user device 104, as described above. The relationship graph may be sent to a user, e.g., at a user device 104, where the user may view and interact with event records (at block 514).

Figure 6:
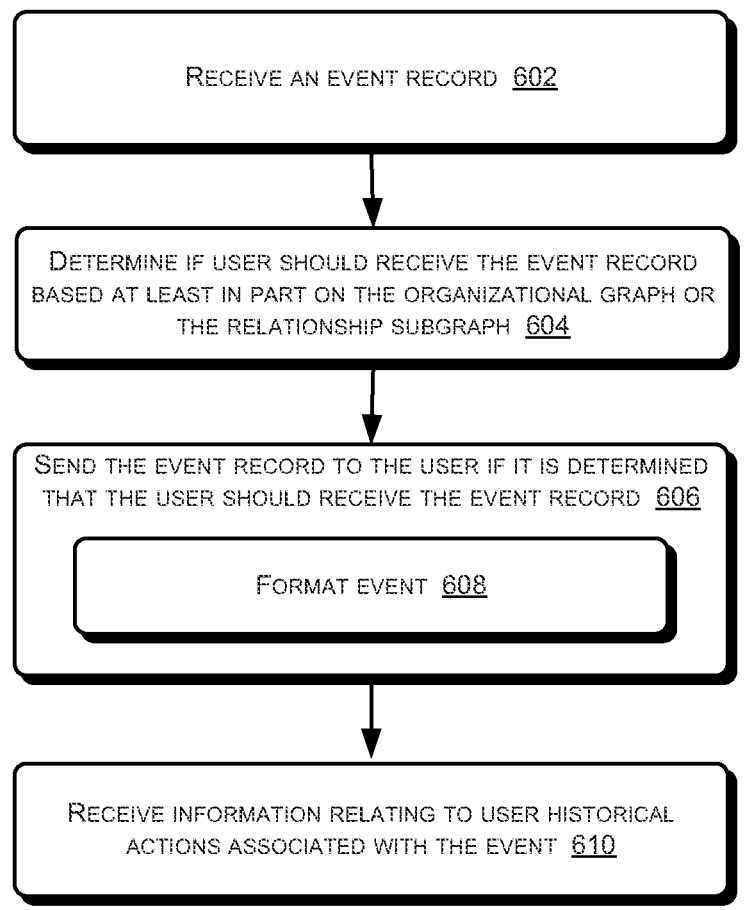
FIG. 6 illustrates an example flow diagram for sending event records associated with events that occur in an organization, according to one embodiment.

FIG. 6 illustrates an example flow diagram for sending event records that occur in an organization, according to one embodiment. An event record may be received at block 602, e.g., by the distribution manager 140. An event may be an occurrence associated with users or network elements in an organization, including, but not limited to, outages, abnormal conditions, other incidents, service requests, or records or reports. At block 604, a determination can be made whether the user should receive the event record based on the organizational graph or subgraph. The determination may include applying a user's preferences, historical actions, or other criteria to an event to adjust the weight for the edge or edges connecting the user to the node associated with the event. If the weight (or adjusted weight when user preferences, historical actions, etc. have been applied) is greater than a threshold value, for example, then the event record received at block 602 may be sent to the user at block 606. Conversely, if the weight (or adjusted weight when user preferences, historical actions, etc. have been applied) is less than a threshold value, then the user may not receive the event record. Sending the event record may also include formatting the event record, e.g., by the event presentation module 150, for presentation at a user device, e.g., user device 104 (at block 608). Various formatting techniques may be applied to distinguish the event record from other event records, such as color-coding, shading, or audible alarms associated with receiving and/or viewing an event record, as non-limiting examples. Example techniques are described above in association with event presentation module 150 on event distribution device 110 and client event application 115 on user device 104.

At block 610, information relating to user historical actions associated with an event may be received. Such actions (e.g., viewing event records, adding comments to event records, deleting event records, saving event records, etc.) may be stored and analyzed to determine their impact on a weight for an edge or edges connecting the user to a node to which the event record is related, in one embodiment. As described, a user's historical actions may cause an adjustment to the weight such that a user may begin to receive certain event records or no longer receive certain event records.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:
1. A system comprising:
   at least one memory that stores computer-executable instructions;
   at least one processor configured to access the at least one memory, wherein the at least one processor is configured to execute the computer-executable instructions to:

receive information associated with one or more users and one or more network elements in an organization;

generate a relationship graph based at least in part on the information, the relationship graph comprising a plurality of nodes and one or more edges connecting the plurality of nodes, wherein the plurality of nodes comprise a first node, a second node, and a user node, and wherein the first node represents a first network element of the one or more network elements and the user node represents a user of the one or more users;

determine one or more weights for the one or more edges, wherein at least one of the one or more weights is based at least in part on an operational dependency between the first node and the second node;

receive an event record comprising information associated with an incident occurring at the first node, wherein the first node is connected to the user node by at least a first edge that has a first weight of the one or more weights;

determine the user node for receiving the event record based at least in part on the first weight; and send at least a portion of the event record to a device associated with the user represented by the user node.

2. The system of claim 1, wherein the at least one processor is further configured to execute the computer-executable instructions to adjust the first weight based at least in part on at least one of user preferences associated with the user node or historical actions associated with the user node.

3. The system of claim 2, wherein the at least one processor is further configured to execute the computer-executable instructions to compare the adjusted weight to a threshold value.

4. The system of claim 3, wherein the at least one processor is further configured to execute the computer-executable instructions to, when the first weight is greater than the threshold value, send the at least a portion of the event record to the device associated with the user node.

5. The system of claim 1, wherein the user node and the first node are separated by the second node, and the user node and the second node are connected by a second edge having a second weight.

6. The system of claim 5, wherein the at least one processor is further configured to execute the computer-executable instructions to determine that the user should receive the event record based at least in part on the second weight of the second edge.

7. The system of claim 1, the at least one processor further configured to execute computer-executable instructions to:

generate a relationship subgraph based at least in part on the relationship graph; and send the relationship subgraph to a user device.

8. The system of claim 7, wherein generating the relationship subgraph comprises selecting one or more nodes from the plurality of nodes based at least in part on at least one weight of at least one edge connecting the one or more nodes.

9. The system of claim 1, wherein the first weight is based at least in part on an operational dependency between the first node and the user node.

10. The system of claim 1, wherein the one or more network elements include at least one of hardware or software.

11. The system of claim 1, wherein the first weight is based at least in part on an organizational chart associated with the user.

12. The system of claim 1, the at least one processor further configured to execute the computer-executable instructions to update the relationship graph based on one or more of user historical actions, changes in network topology, changes in an organizational chart, changes in user preferences, changes in historical data, or changes in event patterns.

13. The system of claim 1, wherein the incident is a first incident, the at least one processor further configured to execute the computer-executable instructions to send a notification to the second node about a second incident related to the first incident before the second incident occurs at the second node.

14. The system of claim 1, the at least one processor further configured to execute the computer-executable instructions to send a notification to a third node of the plurality of nodes about the incident, wherein the third node is selected based at least in part on a second weight of at least a second edge connecting the third node to the first node.

15. One or more non-transitory computer-readable media storing computer-executable instructions that, when executed by at least one processor, configure the at least one processor to perform operations comprising:

receiving information associated with one or more users and one or more network elements in an organization;

generating a relationship graph based at least in part on the information, wherein the relationship graph comprises a plurality of nodes and one or more edges connecting the plurality of nodes, wherein the plurality of nodes comprises a first node, a second node, and a user node, and wherein the first node represents a first network element of the one or more network elements and the user node represents a user of the one or more users;

receiving information associated with at least one of user preferences or user historical actions associated with the user node;

receiving an event record comprising information associated with an incident occurring at the first node, wherein the first node is connected to the user node by at least a first edge that has a first weight;

adjusting the first weight of the first edge based at least in part on at least one of the user preferences or the user historical actions;

determining the user node for receiving the event record based at least in part on the first weight of the first edge; and sending at least a portion of the event record to a device associated with the user represented by the user node.

16. The one or more non-transitory computer-readable media of claim 15, the at least one processor further configured to perform the operations comprising comparing the first weight to a threshold value, wherein the at least a portion of the event record is sent when the first weight is greater than the threshold value.

17. The one or more non-transitory computer-readable media of claim 15, wherein the first weight is further based at least in part on an operational dependency between the user node and the first node.

18. The one or more non-transitory computer-readable media of claim 15, wherein the user historical actions comprise at least one of adding a comment to the event record, deleting the event record, or saving the event record.

19. A method comprising:

receiving, by a computing system comprising one or more computers, information associated with one or more users and one or more network elements in an organization;

generating, by the computing system, a relationship graph based at least in part on the information, the relationship graph comprising a plurality of nodes and one or more edges connecting the plurality of nodes, wherein the plurality of nodes comprises a first node, a second node, and a user node, and wherein the first node represents a first network element of the one or more network elements and the user node represents a user of the one or more users;

determining, by the computing system, one or more weights for the one or more edges, wherein at least one of the one or more weights is based at least in part on an operational dependency between the first node and the second node;

receiving, by the computing system, an event record comprising information associated with an incident occurring at the first node, wherein the first node is connected to the user node by at least a first edge that has a first weight of the one or more weights;

determining the user node for receiving the event record based at least in part on the first weight of the first edge; and sending at least a portion of the event record to a device associated with the user represented by the user node.

20. The method of claim 19, further comprising:
comparing, by the computing system, the first weight to a threshold value; and
when the first weight is greater than the threshold value, sending at least a portion of the event record to a device associated with the user node.

21. The method of claim 20, further comprising:
adjusting, by the computing system, the first weight of the first edge based at least in part on at least one of user preferences associated with the user or historical actions associated with the user; and
comparing, by the computing system, the adjusted weight to the threshold value.

22. The method of claim 19, further comprising:
generating, by the computing system, a relationship subgraph based at least in part on the relationship graph; and
sending, by the computing system, the relationship subgraph to a user device.

23. The method of claim 22, wherein generating the relationship subgraph comprises selecting one or more nodes from the plurality of nodes based at least in part on at least one weight of at least one edge connecting the one or more nodes.

* * * * *